United States Patent
Meerdink et al.

(10) Patent No.: US 11,998,019 B2
(45) Date of Patent: Jun. 4, 2024

(54) CUTTING SYSTEM FOR CUTTING CARCASS PARTS WHILE THE CARCASS PARTS ARE CARRIED BY CARRIERS CONNECTED TO AND MOVED BY AN OVERHANG TRANSPORT SYSTEM

(71) Applicant: MAREL MEAT B.V., Boxmeer (NL)

(72) Inventors: Jan Meerdink, Boxmeer (NL); Franciscus Theodorus Henricus Johannes Van Der Steen, Boxmeer (NL); Cornelis Joannes Janssen, Boxmeer (NL); Bastiaan Martinus Cornelis Albers, Boxmeer (NL); Heinz Madsen, Lichtenvoorde (NL); Leonardus Jozephus Antonius Tiggeloven, Lichtenvoorde (NL); Niels Antonio William Koster, Lichtenvoorde (NL)

(73) Assignee: MAREL MEAT B.V., Boxmeer (NL)

( * ) Notice: Subject to any disclaimer, the term of this patent is extended or adjusted under 35 U.S.C. 154(b) by 80 days.

(21) Appl. No.: 17/928,909

(22) PCT Filed: Jun. 8, 2021

(86) PCT No.: PCT/EP2021/065334
§ 371 (c)(1),
(2) Date: Nov. 30, 2022

(87) PCT Pub. No.: WO2021/250023
PCT Pub. Date: Dec. 16, 2021

(65) Prior Publication Data
US 2023/0225338 A1 Jul. 20, 2023

(30) Foreign Application Priority Data
Jun. 9, 2020 (EP) .................................... 20178888

(51) Int. Cl.
*A22B 5/00* (2006.01)
*A22C 15/00* (2006.01)
*A22C 17/02* (2006.01)

(52) U.S. Cl.
CPC .......... *A22B 5/0029* (2013.01); *A22B 5/0041* (2013.01); *A22C 15/001* (2013.01); *A22C 15/003* (2013.01); *A22C 17/02* (2013.01)

(58) Field of Classification Search
CPC ...... A22C 17/02; A22B 5/0029; A22B 5/0041
(Continued)

(56) References Cited

U.S. PATENT DOCUMENTS

| 3,916,484 A * | 11/1975 | Kennedy | .............. A22B 5/0058 452/159 |
| 2022/0142187 A1* | 5/2022 | Meerdink | .............. A22B 5/007 |

FOREIGN PATENT DOCUMENTS

| GB | 2427121 A | 12/2006 |
| WO | 2020106151 A1 | 5/2020 |

OTHER PUBLICATIONS

Search Report from corresponding European Application No. 20178888.2, Dec. 7, 2020.
(Continued)

*Primary Examiner* — Richard T Price, Jr.
(74) *Attorney, Agent, or Firm* — Workman Nydegger

(57) ABSTRACT

A cutting system is provided for cutting carcass parts while the carcass parts are carried by carriers connected to and moved by an overhang transport system. A detection device is provided for determining a cutting position of an incoming carcass part. At least one cutting device having an upwardly and downwardly facing surface structure is provided and a moving mechanism is mechanically connected to the at least one cutting device for controlling the position of the at least one cutting device on the basis of the
(Continued)

determined cutting position. A carcass displacement device is arranged to initiate displacement of the carcass part away from the at least one cutting position while the carcass part or a resulting sub-part carried by a carrier and is located between the upstream cutting edge and the downstream edge.

15 Claims, 8 Drawing Sheets

(58) Field of Classification Search
USPC ........................................................ 452/149
See application file for complete search history.

(56) References Cited

OTHER PUBLICATIONS

International Search Report from PCT Application No. PCT/EP2021/065334, Aug. 31, 2021.

* cited by examiner

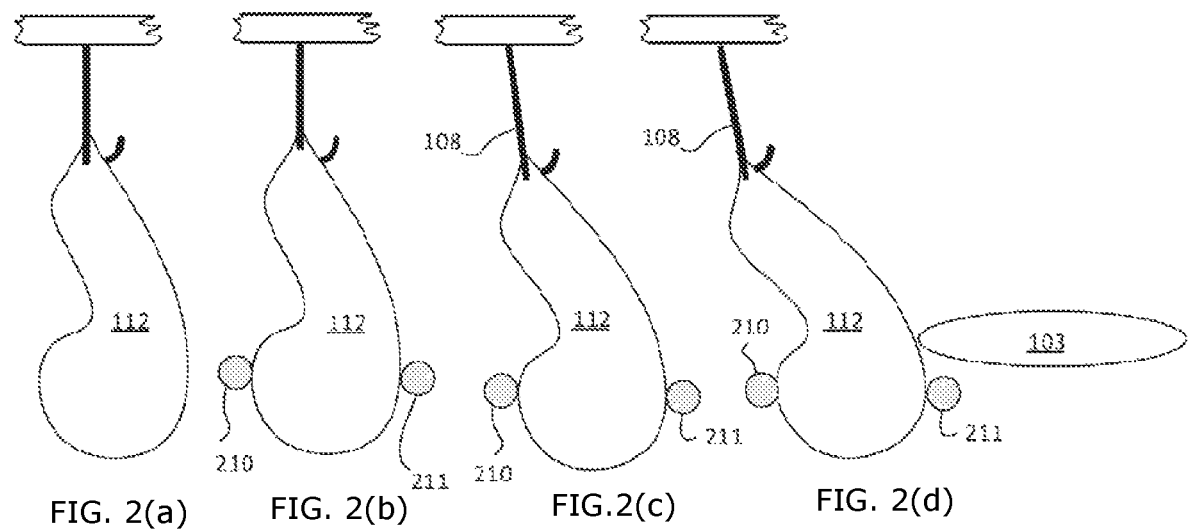
FIG. 2(a)  FIG. 2(b)  FIG. 2(c)  FIG. 2(d)
FIG. 2
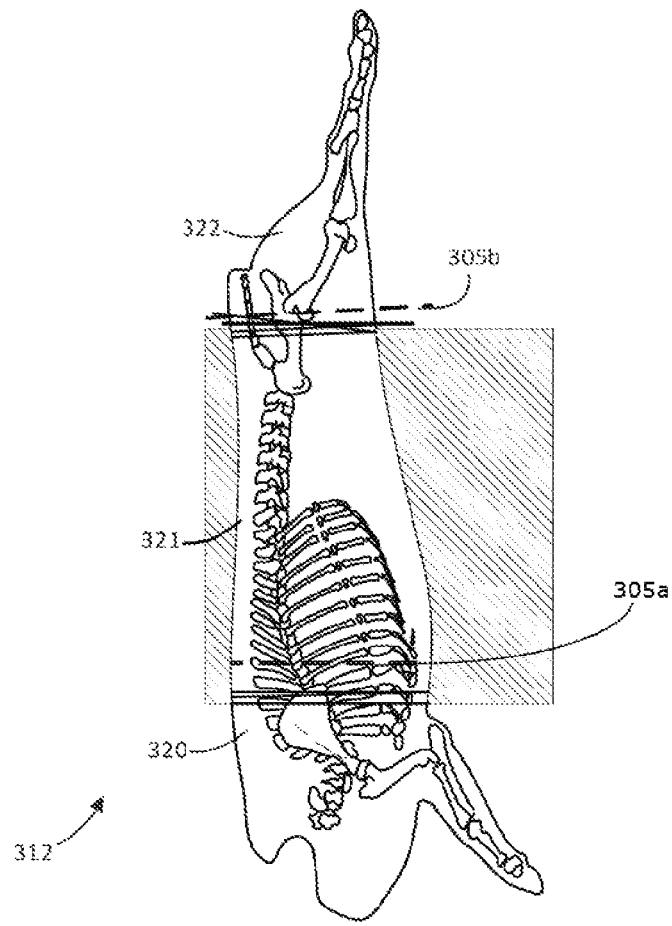
FIG. 3

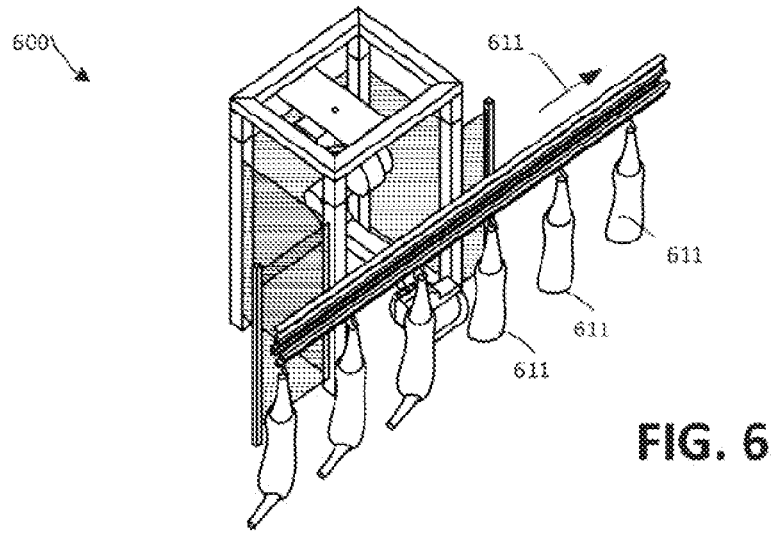
FIG. 6
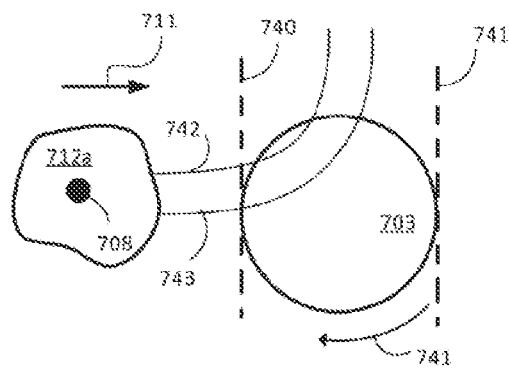
FIG. 7(a)
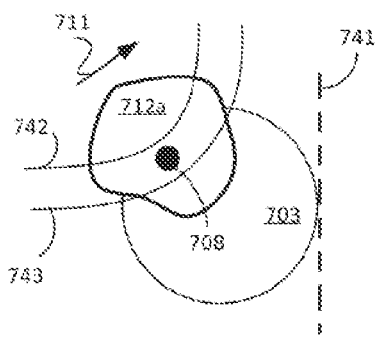
FIG. 7(b)
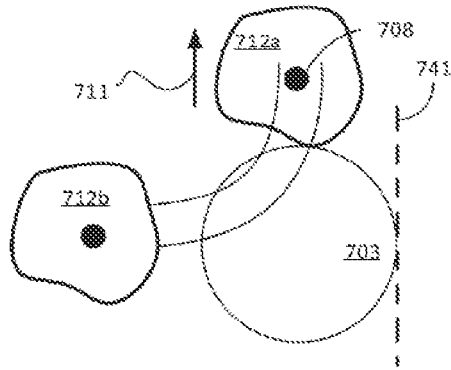
FIG. 7(c)
FIG. 7

CUTTING SYSTEM FOR CUTTING CARCASS PARTS WHILE THE CARCASS PARTS ARE CARRIED BY CARRIERS CONNECTED TO AND MOVED BY AN OVERHANG TRANSPORT SYSTEM

FIELD OF THE INVENTION

The present invention relates to a cutting system and a method for cutting carcass parts while the carcass parts are carried by carriers connected to and moved by an overhang transport system.

BACKGROUND OF THE INVENTION

In existing cutting system commonly used in slaughterhouses, carcass parts such as half beef carcasses, that are carried by carriers connected to and moved by an overhang transport system need to be cut into smaller pieces. A common initial cut is to cut such carcass parts into two pieces, one which remains on the carrier and the other piece drops down onto e.g. an underlying conveyor. The cutting device that is applied is often a circular rotating saw that rotates around a vertical rotation axis or a band saw. Such circular saws can have a diameter of 750 mm, and the vertical cutting position of these circular saws depends on the size and shape of the incoming carcasses. An example of such a cutting process is to utilize a detection device that detects a cutting position on an incoming carcass part, and this is used as an input command in adjusting a vertical height position of circular saw. After the carcass part has been cut into two pieces and after the remaining piece carried by the carrier has passed the circular saw the process is repeated and the height of the circular saw is adjusted for the subsequent incoming carcass part while the circular saw is located between adjacent carcasses. In order to make this possible, the distance between adjacent carcass parts must be at least 750 mm, possible around 1000 mm. This decreases the throughput of the cutting process.

SUMMARY OF THE INVENTION

On the above background it is an object of embodiments of the present invention to enhance the throughput of the cutting process for carcass parts that are conveyed with an overhang transport system. The term carcass part may as an example be understood as a front or hind leg of any four leg animal such as pork, beef, lamb, or it may be half carcass of such a four leg animal, where the carcass parts are carried by carriers. The term carcass part may as an example be understood as a front or hind leg of any four leg animal such as pork, beef, lamb, or it may be a half carcass of such a four leg animal, where the carcass parts are carried by carriers.

In general, the invention preferably seeks to mitigate, alleviate or eliminate one or more of the above mentioned disadvantages of the prior art singly or in any combination. In particular, it may be seen as an object of embodiments of the present invention to provide a cutting system that solves the above mentioned problems, or other problems.

To better address one or more of these concerns, in a first aspect of the invention, a cutting system is provided for cutting carcass parts while the carcass parts are carried by carriers connected to and moved by an overhang transport system, the system comprising:

at least one detection device, such as a detection device, for determining at least one cutting position of an incoming carcass part, at least one cutting device having at least one upwardly and downwardly facing surface structures and an upstream cutting edge and a downstream edge, or at least one cutting device having an upwardly and downwardly facing surface structures and an upstream cutting edge and a downstream edge, or at least one cutting device having an upwardly facing surface structure and a downwardly facing surface structure and an upstream cutting edge and a downstream edge, a moving mechanism mechanically connected to the at least one cutting device for controlling the position of the at least one cutting device on the basis of the determined cutting position, and a carcass displacement device arranged to initiate displacement of the carcass part away from the at least one cutting position while the carcass part or a resulting sub-part carried by a carrier is located between the upstream cutting edge and the downstream edge.

The throughput of the cutting process may thus be increased because the limitation to make the height adjustment of the at least one cutting device when it is positioned between adjacent carcass parts, i.e. await until the carcass part or a resulting sub-part has fully passed the at least one cutting device, is no longer an obstacle meaning that the distance between adjacent incoming carcass parts part may be shortened.

By 'initiate displacement of the carcass part' may be understood displacement of the entire carcass part or one or more or all sub-parts of the entire carcass part.

By 'between the upstream cutting edge and the downstream edge' may be understood between positions on an axis along the conveying direction corresponding to the positions of the upstream cutting edge and the downstream edge.

In one embodiment, the carcass displacement device comprises the at least one cutting device that at least partly contributes in displacing the carcass part away from the cutting position via the moving mechanism by means of controlling height displacement of the at least one cutting device. In an embodiment, the step of controlling the height displacement of the at least one cutting device is performed such that subsequent to cutting the carcass part, e.g. into two pieces or such that such two pieces are still partially connected together, a re-positioning of the at least one cutting device for a subsequent incoming carcass part is carried out in accordance to a determined cutting position for the subsequent carcass part, where the height displacement is carried out such that the upwardly facing surface structure of the at least one cutting device either temporarily acts as a support structure, e.g. for the resulting first sub-piece carried by a carrier causing it to temporarily lift the first sub-piece until it passes the at least one cutting device, or e.g. such that the downwardly facing surface structure at least one cutting device acts as a pusher for a second sub-piece, such as causing it to be removed from the carcass part or from another part of the carcass part. Accordingly, in the case of cutting the carcass part into the first and the second sub-pieces, the first sub-piece is then resting on the at least one cutting device while the height displacement takes place. If the cutting line for the next adjacent carcass part is above this previous cutting line, then the at least one cutting device is moved upwards towards the new cutting line to the new cutting position while the first sub-piece is resting on it so that it is at the right position when the adjacent carcass part reaches the at least one cutting device. This means that the time while the first sub-piece is passing the at least one cutting device may be used to adjust the height displacement of the at least one cutting device.

The displacement of the carcass part away from the at least one cutting position may accordingly be understood as when the height adjustment of the at least one cutting device occurs towards the new cutting position for the subsequent carcass part.

The carcass part may have a pre-cut that may e.g. have been done on an upstream side, and where the determined cutting position comprises identifying this pre-cut position and cut at the pre-cut location.

The height displacement may be understood as a vertical height displacement of the carcass part, or a combination of a vertical and side wise displacement.

The at least one cutting device may include two or more cutting devices that may be jointly mounted on the moving mechanism, where the two or more cutting devices may be configured to perform different cutting operation.

In one embodiment, the carcass displacement device comprises a guiding structure configured to side-wise guide and/or push force on the carcass part during the cutting so as to remove the cut carcass part, or the resulting sub-part, carried by a carrier side-wise from the at least one cutting device before the cut carcass part, or the resulting sub-part, carried by a carrier reaches the downstream edge of the at least one cutting device. The side-wise pushing force may be understood as a force vector that may be pointing perpendicular to the conveying direction of the carcass part (and optionally comprising or consisting of a component pointing perpendicular to the conveying direction in a horizontal plane), or have an angle in an upstream direction (such as making a smallest angle with an upstream direction in the interval]0; 90[degrees and optionally comprising a component pointing perpendicular to the conveying direction in a horizontal plane) or downstream direction (such as making a smallest angle with an upstream direction in the interval] 90; 180[degrees and optionally comprising a component pointing perpendicular to the conveying direction in a horizontal plane). Referring to the previous example where the cutting line for the next adjacent carcass part is above this previous cutting line, the height displacement would preferably not occur until the cut carcass part has been fully removed from the at least one cutting device. It is thus, in addition to higher throughput, ensured that the cut carcass part, or the resulting sub-part (e.g. said first sub-piece), will not fall from the carrier carrying it, which might occur if the difference in the height displacement between the two cutting lines is too large, e.g. because of too big size differences between the two adjacent carcass parts.

The displacement of the carcass part away from the at least one cutting position may accordingly be understood as when the carcass part has been pushed side-wise (optionally in a direction comprising or consisting of a component pointing perpendicular to the conveying direction in a horizontal plane) from the at least one cutting device until the at least one cutting device is free to be moved e.g. upwards or downwards.

In an embodiment, the at least one cutting device comprises a circular rotating cutting saw or blade positioned such that an upwardly facing side of the circular rotating cutting saw defines the upwardly facing surface structure, and a downwardly facing side of the circular rotating cutting saw defines the downwardly facing surface structure. One of the advantages of using circular saw is the minimal amount of sawdust is formed from the cutting process. It is common to use circular saws having a diameter 750 mm, in some instances 500-650 mm, to cut hanging carcasses into two smaller pieces, but the diameter should not be construed to these diameter values. In the prior art systems using such circular rotating cutting saw, the distance between adjacent carcasses must correspond to at least this diameter distance, e.g. at least 750 mm, before the height adjustment can take place. However, according to the present invention, this distance may be reduced down to as an example 50-100 mm or even less since these restrictions to wait until the cut carcass part has completely passed the at least one cutting device is no longer a limitation.

The moving mechanism may in one embodiment comprise a mechanical structure connected to the at least one cutting device and may e.g. comprise a servo driven motor or electrical motor, to move the at least one cutting device upwards/downward. As an example, in the embodiment where the at least one cutting device comprises a circular saw, the moving mechanism may be mechanically connected to a drive shaft mechanism that drives to the at least one cutting device in the rotational movement.

In one embodiment, the circular rotating cutting saw rotates around a vertical rotation axis. In another embodiment, the circular rotating cutting saw rotates around a rotation axis angled in relative to a vertical axis. This angular position or these angular positions may e.g. be adjusted manually by an operator.

In yet another embodiment, the rotation axis is adjustable based on the determined cutting position. Accordingly, the angular position may now be adjusted automatically by e.g. the moving mechanism, and thus the yield of the cut may further be enhanced.

The at least one cutting device may in another embodiment comprise a scissor cutter, or any type of a at least one cutting device such as band saw, depending on the application and the type of carcass parts, where the upper side of the scissor cutter or the band saw define the upwardly facing surface structure and the side facing downwards define the downwardly facing surface structure.

In one embodiment, the detection device comprises one or more of the following:
- a three-dimensional (3D) sensor for capturing a 3D profile of the carcass parts, or
- a light source such as a laser light source for illuminating on the carcass parts where a cut is desired, and a sensor (e.g. digital camera) for capturing reflected light from the carcass parts, where the light source might as an example be operated by an operator that based on visual detection points the light source at the cutting position, or
- a color sensor such as a Red Green Blue (RGB) sensor for capturing color differences on the surface of the carcass parts, or
- an X-ray apparatus for capturing X-ray image of the carcass parts.

In cases where the light source is operated by an operator, e.g. by pointing a laser pen or similar to the cutting position, the operation of the height displacement of the at least one cutting device may be considered as a semi-automatic process, whereas generally in the absence of an operator intervening in the process, the operation may be considered as automatic process.

In one embodiment, the system further comprises a positioning structure configured to interact with the carcass parts while being moved and adjust their angular position such that the carcass parts have a pre-defined angular position when the carcass parts are cut. Accordingly, by selecting such a pre-defined and optimal angular position, it is possible to optimize the cut to achieve maximum yield.

In one embodiment, the system further comprises an engaging device or one or more engaging devices, for engaging with the carcass parts for maintaining the carcass parts in a stationary position relative to the carriers while the cutting takes place. Accordingly, maintaining the carcass parts in a stationary position will not only improve the yield but also enhance the quality of the cut. The engaging device may further be configured to adjust the angular position of the carcass part, e.g. via relative speed difference between the carriers and the engaging structure.

In one embodiment, the moving mechanism comprises a robotic system having at least one manipulation arm, and where the at least one cutting device, such as the circular rotating cutting saw, is attached to the at least one manipulation arm, and where the height displacement of the at least one cutting device is carried out by the at least one manipulation arm.

In one embodiment, the engaging device comprises at least one suction device configured to engage with the carcass part by mean of a suction force while the cutting takes place, and where the suction device is attached to the at least one manipulation arm. Accordingly, a simple solution is provided to remain the carcass parts stationary while the cutting takes place, followed by releasing the suction force e.g. by shutting down the suction force temporarily, e.g. automatically by a vacuum source connected to the suction device, where the process is then repeated on the subsequent carcass part.

In one embodiment, the at least one cutting device and the suction device are attached to different manipulation arms. However, in another alternative, a single manipulator may both carry the at least one cutting device and the suction device.

The upstream cutting edge may be understood as the first contact point where the cutting process starts, and the downstream edge may be understood as the second point where the carcass part or cut sub-part would leave the at least one cutting device as in prior art systems where no "external" force (side-wise pushing, lifting upwards as discussed previously). This means that if e.g. the at least one cutting device comprises a circular rotating cutting saw, the distance between the first and the second point would correspond to the diameter of the circular rotating cutting saw. Similarly, if e.g. the at least one cutting device comprises a band saw, this distance between the first and the second point would correspond to the width of the band saw.

In a second aspect of the invention, a carcass cutting system is provided having a plurality of carriers comprising gambrel carriers, each gambrel having a first end area arranged to carry a first carcass part and an opposite end arranged to carry a second carcass part, wherein the cutting of the first and the second carcass parts is performed simultaneously with two cutting systems according to the present invention, such as with two cutting systems according to the first aspect. Accordingly, the throughput is increased further by running such two cutting processes parallel. As an example, two of said robotic systems may be placed on opposite sides of the gambrel where the cutting process is continued by the respective robotic systems while the gambrels are moved past the robotic systems.

In a third aspect of the invention, a method is provided for cutting carcass parts while the carcass parts are carried by carriers connected to and moved by an overhang transport system, where the cutting is performed using at least one cutting device, such as a cutting device, having at least one upwardly and/or downwardly facing surface structures (or having an upwardly and downwardly facing surface structures, or having an upwardly facing surface structure and a downwardly facing surface structure), and optionally an upstream cutting edge and a downstream edge, the method comprising:

determining, by a detection device, at least one cutting position, such as a cutting position, of an incoming carcass part, controlling the position of the at least one cutting device on the basis of the determined cutting position, and initiating displacement of the carcass part away from the at least one cutting position while the carcass part or a resulting sub-part carried by a carrier is located between the upstream cutting edge and the downstream edge.

In one embodiment, the carcass parts are freely hanging, or partially freely hanging. The carcass parts may be half carcasses of e.g. beef, pork, lamb or any type of four leg animal. The cutting position may as an example be between adjacent ribs, such as between $2^{nd}$ and $3^{rd}$, between $3^{rd}$ or $4^{th}$, between $4^{th}$ and $5^{th}$, and/or at fore end resulting in that the fore ends define the second sub-pieces and optionally a subsequent middle cut such that the middle cuts define the second sub-pieces after the fore end cuts.

In one embodiment, an angular position of the carcass parts is adjusted such that a longitudinal axis of the carcass parts forms an angle relative to a vertical axis when the carcass parts are cut. This angular position is defined based on the position of the cut with the aim of maximizing the yield of the cut. This angular position may be parallel to the movement, or in any angular position relative to the moving direction, e.g. perpendicular to the moving direction, 45 degrees relative to the moving direction and any angular position there between. This angular position may be in the interval [0°; 90°], such as [0°; 45°] or [45°; 90°], with respect to a moving direction.

The cutting position includes or is selected from: a single point position, a straight or curved profile or a 3D profile, e.g. extending partially from one position to another position on the carcass part, e.g. via a laser or light source, or the cutting position may be a point position, i.e. a single coordinate position.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIGS. 2(a)-2(d) depicts a time line sequence of one embodiment of FIGS. 1(a) to 1(c), where the system further comprises an engaging structure for engaging with a lower side of a carcass part and stabilize it, FIG. 3 shows a half carcass part and two different cutting positions, FIG. 4, including FIG. 6 shows a perspective view of a cutting system according to the present invention and discussed in relation to FIG. 5, FIG. 7, including FIGS. 7(*a*)-7(*c*), shows a schematic top view of one embodiment of a cutting system according to the present invention for cutting carcass parts while the carcass parts are carried by carriers connected to and moved by an overhang transport system.

DESCRIPTION OF EMBODIMENTS

Figure 1A:
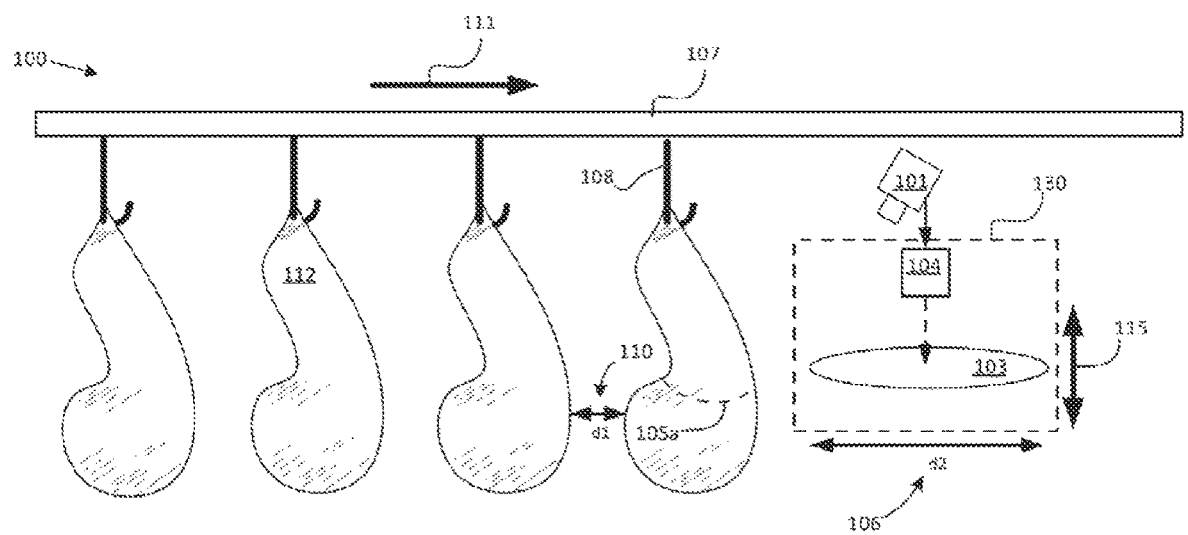
FIGS. 1(a)-1(c) depicts graphically one embodiment of a cutting system according to the present invention for cutting carcass parts into two smaller pieces while the carcass parts are carried by carriers, FIG. 2, including
Figure 1B:
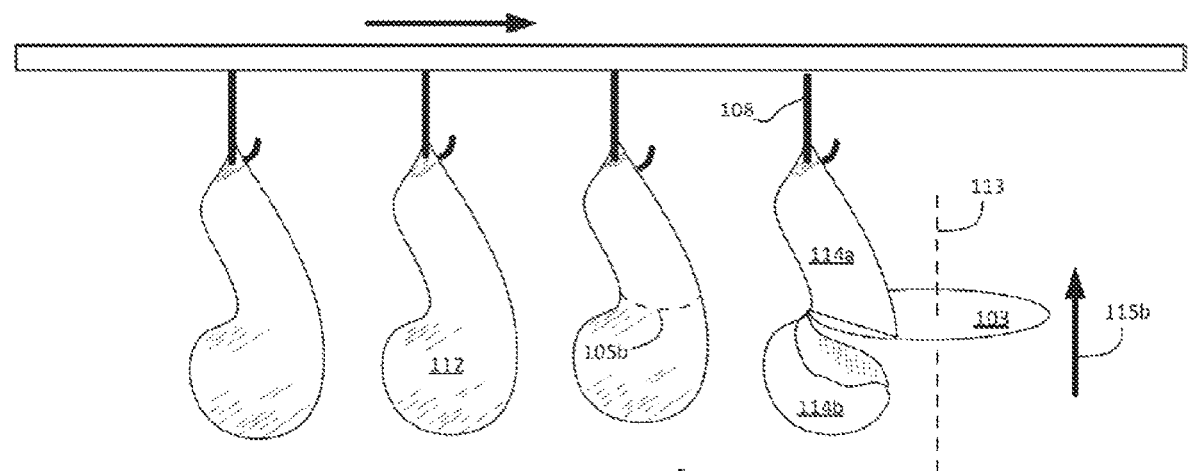
Figure 1C:
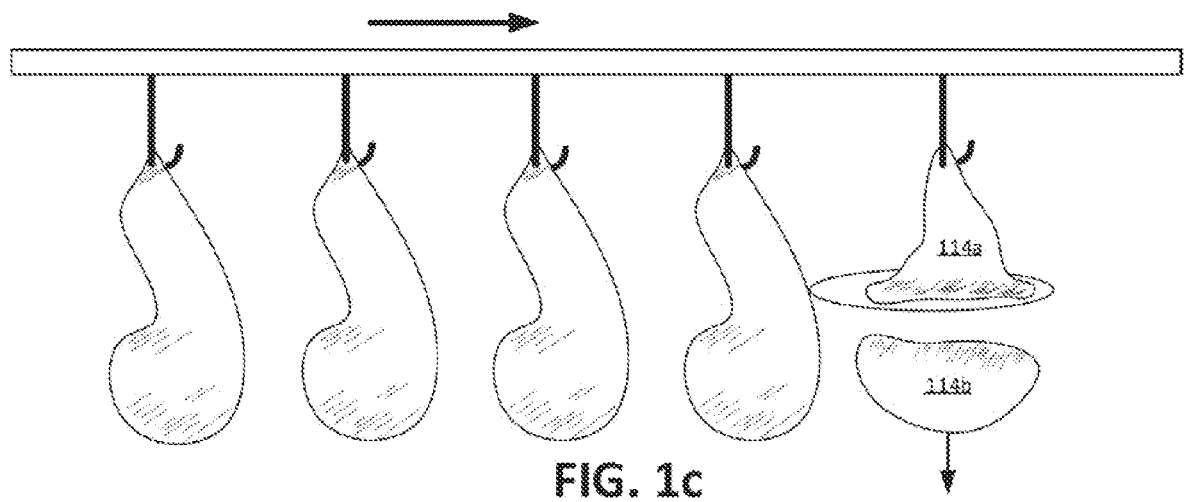

FIGS. 1(*a*)-1(*c*) depicts graphically one embodiment of a cutting system 100 according to the present invention for cutting carcass parts 112 while the carcass parts are carried by carriers 108 connected to and moved in a direction indicated by arrow 111 by an overhang transport system 107, where the system comprises a detection device 101, at least one cutting device 103, a moving mechanism 104 and a carcass displacement device 130.

As shown in this embodiment, the carcass parts are cut into two smaller pieces 114*a*, 114*b*. The present invention should however not be construed as being limited to such a separation into two pieces. The cut may as an example be a partial cut where no such a clear separation takes place such that the upper part and the lower part are partially attached together.

FIG. 1(*a*) depicts a scenario where carcasses 112 are carried by the carriers 108 that are coupled to the overhang transport system 107 and moved towards the at least one cutting device 103 having an upwardly and downwardly facing surface structures.

The detection device 101 is configured for determining at least one cutting position 105*a* of an incoming carcass part, but this may be a single point position or e.g. a 2D or 3D cutting profile, a curved profile or a straight profile. The detection device may comprise, but is not limited to, a three dimensional (3D) sensor for capturing a 3D profile of the carcass parts, or a light source such as a laser light source for illuminating on the carcass parts where a cut is desired, and a sensor for capturing reflected light from the carcass parts, or a color sensor Red Green Blue (RGB) sensor for capturing color differences on the surface of the carcass parts, or an X-ray apparatus for capturing X-ray image of the carcass parts that identifies the cutting position. The detection device may also comprise a manually operated laser pen or similar means where an operator points with the laser to a point of interest on the carcass part and where the reflected light point or light line, indicated by the dotted line, is captured by a sensor. Other types of detection devices well known to a person skilled in the art, may be used.

The moving mechanism 104 mechanically connected to the at least one cutting device and is configured to control the position of the at least one cutting device on the basis of the determined cutting position 105*a*.

The carcass displacement device arranged to initiate displacement of the carcass part away from the at least one cutting position while the carcass part or a resulting sub-part carried by a carrier is located between the upstream cutting edge and the downstream edge. In the embodiment shown here, the carcass displacement device comprises the at least one cutting device, which is a rotating circular cutting saw, that at least partly contribute in displacing the carcass part away from the cutting position via the moving mechanism by means of controlling height displacement 115 of the at least one cutting device. The rotating circular cutting saw rotates around a rotation axis, which as shown here may as an example be a vertical rotation axis. The moving mechanism 104 is mechanically connected to the at least one cutting device for controlling the position of the at least one cutting device on the basis of the determined cutting position.

FIG. 1(*b*) depicts the scenario where the circular saw 103 has just performed a horizontal (or angular) cut through the carcass part, i.e. into a first carcass part 114*a* that is still attached to the carrier 108 and the second carcass part 114*b*. The controlling includes at this moment in time, or around this moment in time (either shortly before or shortly after), re-positioning the circular saw 103 for the subsequent cut, based on image data, in this case the cutting line 105*b* in FIG. 1(*b*) for the subsequent carcass part. As depicted here, the cutting line 105*b* is above the cutting line 105*a* shown in FIG. 1(*a*), meaning that the moving mechanism 104 will adjust the height position of the at least one cutting device upwards as indicated by arrow 115*b*. In this case, this upwards displacement is carried out causing the upwardly facing surface structure of the circular saw to act as a temporal support surface while the first sub-piece 114*a* passes the circular saw. This results in that valuable time is saved and the circular saw is repositioned for the subsequent carcass part as shown in FIG. 1(*c*), while the first sub-piece passes the saw. Accordingly, the distance d1 110 can be shortened significantly compared to distance d2 106, i.e. spacing distance d1>d2 between adjacent carcass parts in prior art system that is needed to give the circular saw the space needed to adjust its height position is no longer needed.

As depicted in this embodiment, the circular saw rotates around an axis 113, but in one embodiment the controlling may further include that the moving mechanism 104 further adjusts the rotation axis on the basis of the determined cutting position such that the new rotation axis, which may only be adjusted temporarily during the cutting, forms and angle relative to the axis 113.

It should be noted that the at least one cutting device should not be construed as being limited to a circular saw, other at least one cutting devices well known to a skilled person may just as well be used, such as, scissor cutter, band saw cutter, and the like.

FIG. 2 depicts a time line sequence of one embodiment of FIGS. 1(*a*) to 1(*c*), where the system 100 further comprises a positioning structure 210, 211 for interacting with a lower side of a carcass part 112, in this case below the determined cutting position, for adjusting the angular position of it so that it has a pre-defined angular position relative to the carrier 108 while the cutting takes place as shown in FIGS. 2(*c*) and 2(*d*).

The angular adjustment may be parallel to the movement direction of the carcass part, or in any angular position relative to the moving direction, e.g. perpendicular to the moving direction, 45 degrees relative to the moving direction and any angular position there between. One way of achieving such an angular adjustment of the carcass part is when the engaging structure and the carrier move relative to each other with a different speed up which may be seen in FIG. 2(*c*) and FIG. 2(*d*), until the pre-defined angular position is obtained for the cutting. The height adjustment of the at least one cutting device discussed in relation to FIGS. 1(*a*) to 1(*c*) applies also here.

FIG. 3 shows a half carcass part 312 and two different cutting positions, a first cutting position 305*a*, which result in that a fore end part 320 is removed first, and a second cutting position 305*b*, which results in that a middle part 321 is subsequently removed leaving the remaining leg part 322 on the carrier (not shown).

Figure 4:
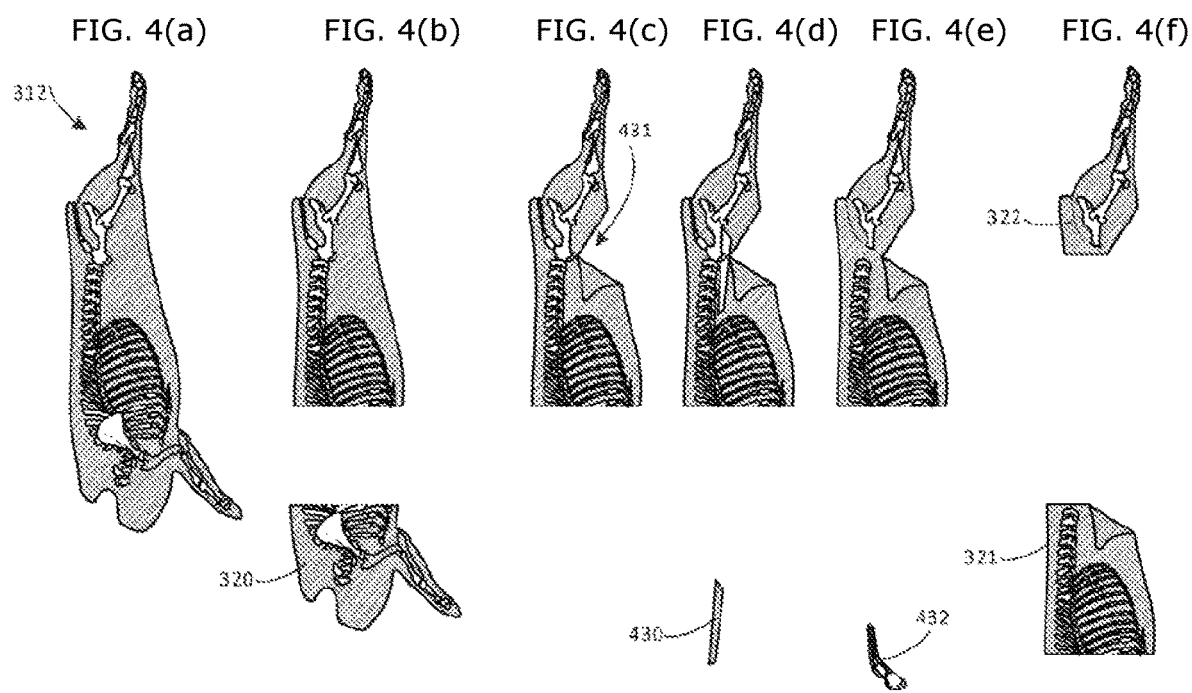
FIGS. 4(a)-4(f) illustrates graphically the cut discussed in relation to FIG. 3 where additionally intermediate cutting steps may be performed.

This is illustrated graphically in FIG. 4, where additionally intermediate cutting steps may be performed, namely a flank cut 431, where also the tenderloin 430 and tailbone 432 are removed.

Figure 5:
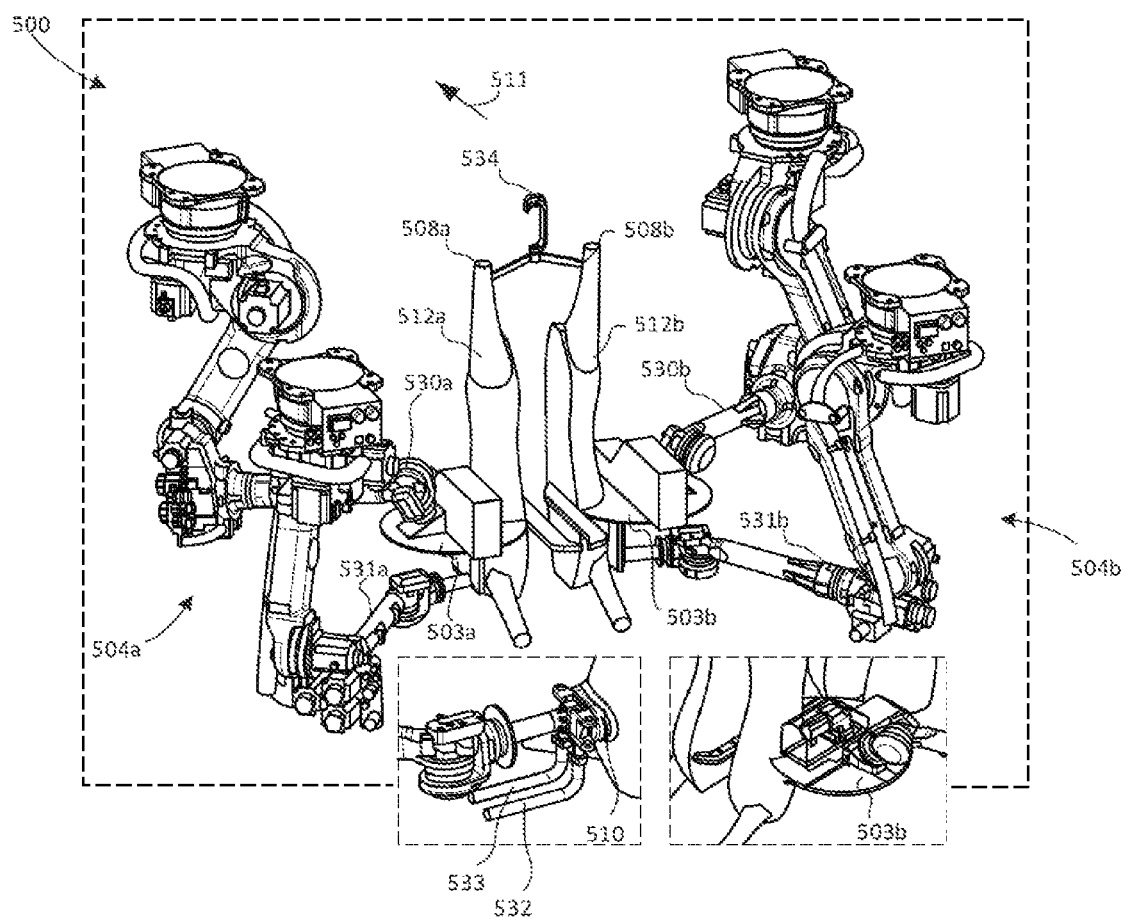
FIG. 5 shows another embodiment of the cutting system according to the present invention.

FIG. 5 shows another embodiment of the cutting system 500 according to the present invention, where the moving mechanism comprises a robotic system 504*a,b*. The two robotic systems 540*a* and 540*b* shown here are positioned opposite to each such that two carcass parts 512*a,b* are cut simultaneously. The two carcass parts are carried by a gambrel 534 at its opposite ends 508*a,b*, where the gambrel is moved by an overhang transport system (not shown) in a direction indicated by arrow 511.

This embodiment should not be construed as being limited in using two robotic systems, a single robotic system may of course be used where the incoming carcass part is carried by a single carrier.

Each of the two robotic systems 540*a,b* comprise a first manipulation arm 530*a,b* that carries a circular saw 503*a,b*, and where the height displacement of the circular saw 503*a,b* is carried out by the at least one manipulation arm.

Each of the robotic systems 540*a,b* further comprises a second manipulation arm 531*a,b* that carries a suction device 510 (see the zoomed up view) acting as an engaging device to engage with the lower side of the carcass parts 504*a,b* by mean of a suction force via e.g. pipes 532, 522 that are connected to a vacuum device (not shown), where the suction device ensures that the carcass parts 512*a,b* are stationary position relative to the carriers while the cutting takes place.

The vacuum source may be operated by a control unit (not shown) to release the suction force after the cut has been completed, and turn it on for the subsequent carcass part (not shown here).

The robotic system shown here, and the manipulation arms may in one embodiment have 5-7 degrees of freedom.

FIG. 6 shows a perspective view of a cutting system 600 according to the present invention and discussed in relation to FIG. 5 moving carcass parts in a moving direction 611, where only one side of such a robotic pairs is shown. Shown is also three carcass parts that have been cut into two pieces 611.

FIG. 7 shows a schematic top view of one embodiment of a cutting system according to the present invention for cutting carcass parts 712 while the carcass parts are carried by carriers 708 and connected to and moved by an overhang transport system, showing at least one cutting device 703, which in this embodiment comprises a circular rotating cutting saw 703 as discussed in relation to e.g. the embodiment shown in FIGS. 1(*a*) to 1(*c*), but the at least one cutting device may just as well comprise a band saw or any type of a cutting device suitable to be used within the food industry.

The dotted lines 740, 741 indicate an upstream cutting edge and a downstream (cutting) edge of the circular rotating cutting saw 703. In case of e.g. a band saw, this would be the distance between a front cutting edge and a downstream end of the band saw, i.e. the width of the band saw, where the band saw typically rotates around a horizontal rotation axis.

Moreover, shown is a carcass displacement device, which as depicted here comprises guiding structure 742, 743 that guides the carcass part in the path shown.

The carcass displacement device may also be considered any type of a guide system, e.g. the overhang transport system that is capable of providing a side-wise displacement or a pushing force 711 (this may also be seen as the moving direction of the carcass part 712*a*) as indicated by the arrow 711.

The carcass displacement device is as shown here arranged to initiate displacement of the carcass part away from the at least one cutting position while the carcass part 712*a* carried by the carrier 708 is located between the upstream cutting edge 740 and the downstream edge 741. As illustrated here, this occurs before the carcass part reaches the downstream edge 741 and has been "pushed" or transferred from the cutting position shown in FIGS. 7(*a*) and 7(*b*).

In FIG. 7(*c*), the carcass part 712*a* is fully "released" from the at least one cutting device 703, meaning that height displacement can now be adjusted before the next incoming carcass part 712*b* reaches the at least one cutting device 703.

Figure 8:
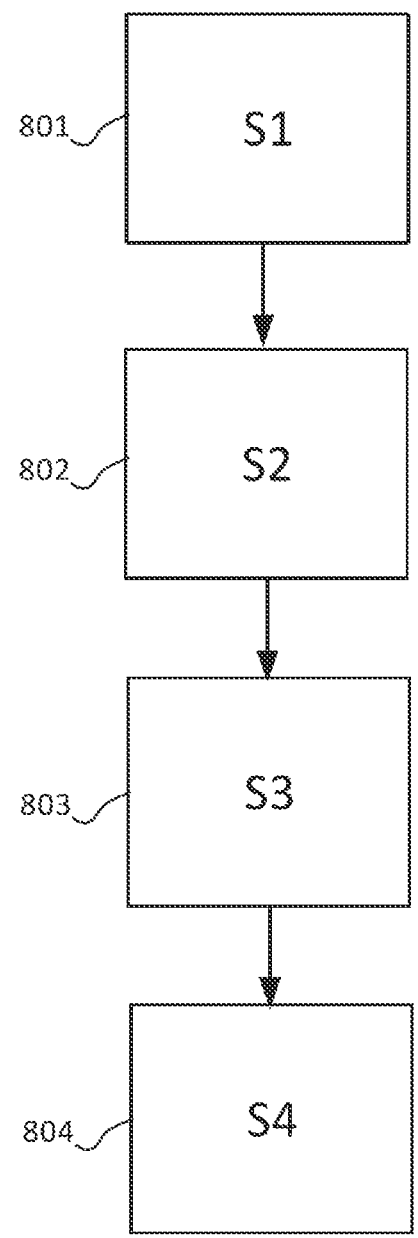
FIG. 8 shows a flowchart of a method according to the present invention for cutting carcass parts into smaller pieces.

FIG. 8 shows a flowchart of a method according to the present invention for cutting carcass parts.

In step (S1) 810, the carcass parts are placed on carriers such as hooks such that they are freely hanging, or partially freely hanging and attached to an overhang transport system that moves the carcass parts in a moving direction towards at least one cutting device.

In step (S2) 802, a cutting position of an incoming carcass part is determined using a detection device. This may be done using, but is not limited to, any type of a sensor, a line scanner where the outer surface is scanned and e.g. a 3D profile is generated, a color sensor such as RGB sensor, an X-ray apparatus to capturing X-ray data of the carcass part, a laser line may be pointed to a cutting position where a sensor detects the reflected light, or a RGB sensor.

In step (S3) 803, the position of the at least one cutting device is controlled on the basis of the determined cutting position.

In step (S4) 804, displacement of the carcass part is initiated away from the at least one cutting position while the carcass part or a resulting sub-part carried by a carrier is located between the upstream cutting edge and the downstream edge.

This may as an example be done via the height displacement of the at least one cutting device as discussed in relation to FIGS. 1(*a*) to 1(*c*) or via side-wise displacement as discussed in relation to FIG. 7.

Figure 9:
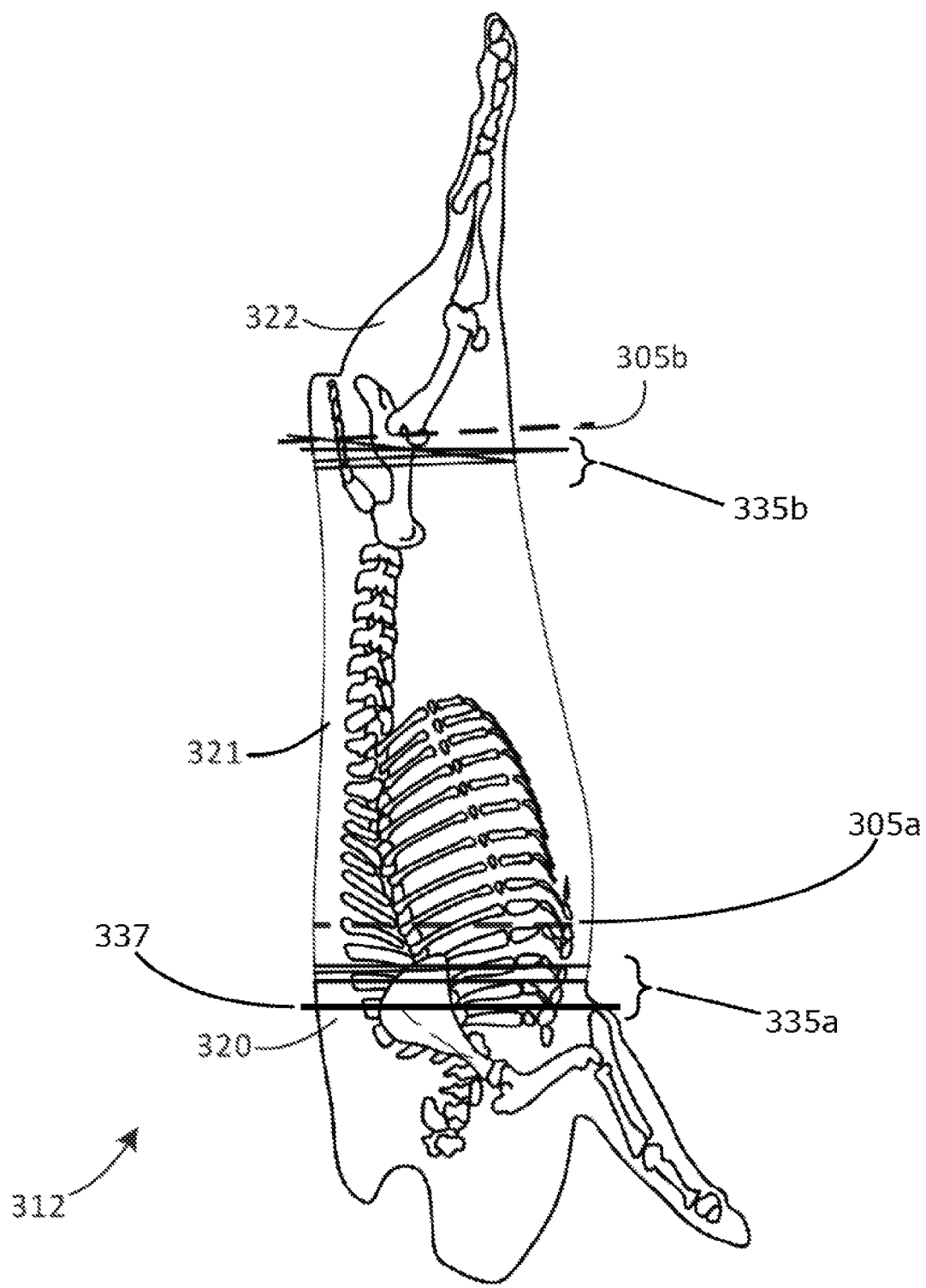
FIG. 9 shows a half carcass part as in FIG. 3 and furthermore showing (with dashed lines) the first cutting position and the second cutting position also shown in FIG. 3.

FIG. 9 shows a half carcass part 312 as in FIG. 3 and furthermore showing (with dashed lines) the first cutting position 305*a* and the second cutting position 305*b* also shown in FIG. 3. Additionally, FIG. 9 shows alternative cutting positions indicated with full drawn lines, and more particularly alternative first cutting positions 335*a* and alternative second cutting positions 335*b*.

According to an embodiment there is provided a (alternative) first cutting position 337, which is separating the fore end part 320 from the remainder of the half carcass part 312 through the shoulder blade, such as for the purpose of (enabling or facilitating) providing a (US style) butt/picnic cut.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A cutting system for cutting carcass parts while the carcass parts are carried by carriers connected to and moved by an overhang transport system, the system comprising:
   a detection device for determining at least one cutting position of an incoming carcass part,
   at least one cutting device having an upwardly and downwardly facing surface structures and an upstream cutting edge and a downstream edge,
   a moving mechanism mechanically connected to the at least one cutting device for controlling the position of the at least one cutting device on the basis of the determined cutting position, and
   a carcass displacement device arranged to initiate displacement of the carcass part away from the at least one cutting position while the carcass part or a resulting sub-part carried by a carrier is located between the upstream cutting edge and the downstream edge.

2. The system according to claim 1, wherein the carcass displacement device comprises the at least one cutting device that at least partly contribute in displacing the carcass part away from the cutting position via the moving mechanism by means of controlling height displacement of the at least one cutting device.

3. The system according to claim 2, wherein controlling the height displacement of the at least one cutting device is performed such that subsequent to cutting the carcass part into two pieces, a re-positioning of the at least one cutting device for a subsequent incoming carcass part is carried out in accordance to a determined cutting position for the subsequent carcass part, where the height displacement is carried out such that the upwardly facing surface structure of the at least one cutting device either temporarily acts as a support structure for the resulting first sub-piece attached to a carrier causing it temporarily lift the first sub-piece until it passes the at least one cutting device, or such that the downwardly facing surface structure at least one cutting device acts as a pusher for a second sub-piece causing it to be removed from the carcass part.

4. The system according to claim 1, wherein the carcass displacement device comprises a guiding structure configured to side-wise guide and/or push the carcass part during the cutting so as to remove the cut carcass part, or the resulting sub-part, carried by a carrier side-wise from the at least one cutting device before the cut carcass part, or the resulting sub-part, carried by a carrier reaches the downstream edge of the at least one cutting device.

5. The cutting system according to claim 1, wherein the at least one cutting device comprises a circular rotating cutting saw positioned such that an upwardly facing side of the circular rotating cutting saw defines the upwardly facing surface structure, and a downwardly facing side of the circular rotating cutting saw defines the downwardly facing surface structure, where e.g. the circular rotating cutting saw rotates around a rotation axis, such as around vertical rotational axis or a rotation axis having an angle in relation to a vertical axis.

6. The cutting system according to claim 1, wherein the at least one cutting device comprises a band saw positioned such that an upwardly facing side of the band saw defines the upwardly facing surface structure, and a downwardly facing side of the band saw defines the downwardly facing surface structure.

7. The cutting system according to claim 1, wherein the detection device comprises one or more of the following:
   a three-dimensional (3D) sensor for capturing a 3D profile of the carcass parts, or
   a light source such as a laser light source for illuminating on the carcass parts where a cut is desired, and a sensor for capturing reflected light from the carcass parts, or
   a color sensor such as a Red Green Blue (RGB) sensor for capturing color differences on the surface of the carcass parts, or
   a X-ray apparatus for capturing X-ray image of the carcass parts.

8. The cutting system according to claim 1, further comprising a positioning structure configured to interact with the carcass parts while being moved and adjust their angular position such that the carcass parts have a pre-defined angular position when the carcass parts are cut.

9. The cutting system according to claim 1, further comprising an engaging device for engaging with the carcass parts for maintaining the carcass parts in a stationary position relative to the carriers while the cutting takes place.

10. The cutting system according to claim 9, wherein the engaging device comprises at least one suction device configured to engage with the carcass part by means of a suction force while the cutting takes place, and where the suction device is attached to the at least manipulation arm.

11. The cutting system according to claim 1, wherein the moving mechanism comprises a robotic system having at least one manipulation arm, and where the at least one cutting device is attached to the at least manipulation arm, and where the height displacement of the at least one cutting device is carried out by the at least one manipulation arm.

12. The cutting system according to claim 11, wherein the at least one cutting device and the suction device are attached to different manipulation arms.

13. A carcass cutting system having a plurality of carriers comprising gambrel carriers, each gambrel having a first end area arranged to carry a first carcass part and an opposite end arranged to carry a second carcass part,
   wherein the cutting of the first and the second carcass parts is performed simultaneously with two cutting systems according to claim 1.

14. A method for cutting carcass parts while the carcass parts are carried by carriers connected to and moved by an overhang transport system, where the cutting is performed using a at least one cutting device having an upwardly and downwardly facing surface structures, the method comprising:
   determining, by a detection device, a cutting position of an incoming carcass part,
   controlling the position of the at least one cutting device on the basis of the determined cutting position, and
   initiating displacement of the carcass part away from the at least one cutting position while the carcass part or a resulting sub-part carried by a carrier is located between the upstream cutting edge and the downstream edge.

15. The method according to claim 14, wherein the carcass parts are half carcasses from a four leg animal such as beef, lamb, pork, and where the cutting position is between adjacent ribs, such as between 2nd and 3rd, between 3rd or 4th, between 4th and 5th, and/or at fore end resulting in that the fore ends define second sub-pieces and optionally a subsequent middle cut such that the middle cuts define the second sub-pieces after the fore end cuts.

\* \* \* \* \*